(12) United States Patent
Giannoni (10) Patent No.: US 9,909,779 B2
(45) Date of Patent: Mar. 6, 2018

(54) METHOD OF MANUFACTURING A SET OF HEAT EXCHANGE CELLS AND SET OF HEAT EXCHANGE CELLS THUS OBTAINED

(71) Applicant: CONDEVO S.P.A., Milan (IT)

(72) Inventor: Rocco Giannoni, Marudo (IT)

(73) Assignee: Condevo S.p.a., Marudo (IT)

( * ) Notice: Subject to any disclaimer, the term of this patent is extended or adjusted under 35 U.S.C. 154(b) by 10 days.

(21) Appl. No.: 15/126,139

(22) PCT Filed: Mar. 17, 2015

(86) PCT No.: PCT/IB2015/051951
§ 371 (c)(1),
(2) Date: Sep. 14, 2016

(87) PCT Pub. No.: WO2015/140713
PCT Pub. Date: Sep. 24, 2015

(65) Prior Publication Data
US 2017/0074546 A1    Mar. 16, 2017

(30) Foreign Application Priority Data

Mar. 17, 2014 (WO) .................. PCT/IB2014/059898

(51) Int. Cl.
*F24H 1/43* (2006.01)
*F24H 8/00* (2006.01)
(Continued)

(52) U.S. Cl.
CPC ................ *F24H 1/43* (2013.01); *B23P 15/26* (2013.01); *F24H 8/00* (2013.01); *F28D 7/024* (2013.01); *F28F 1/02* (2013.01); *Y02B 30/102* (2013.01)

(58) Field of Classification Search
CPC . F24H 8/00; F24H 1/43; F28D 1/0391; F28D 7/024; F24D 5/12; B21D 53/04; B23P 15/26; F28F 1/02; Y02B 30/102
(Continued)

(56) References Cited

U.S. PATENT DOCUMENTS 4,901,677 A    2/1990  Demetri
2006/0219395 A1  10/2006  Le Mer
(Continued)

FOREIGN PATENT DOCUMENTS

EP    0745813    12/1996
EP    1160521    12/2001
(Continued)

OTHER PUBLICATIONS

International Search Report dated Jul. 2, 2015, for PCT/IB2015/051951.

*Primary Examiner* — Davis Hwu
(74) *Attorney, Agent, or Firm* — Clayton, McKay & Bailey, PC (57) ABSTRACT

A method is described of manufacturing a set of heat exchange cells (1a-1d) having a thermal power falling within a predetermined range of minimum and maximum values, each heat exchange cell (1a-1d) comprising at least one heat exchanger (2) mounted in a respective containment casing (5), wherein the method comprises the steps of: a) providing a single containment casing (5) of a plurality of heat exchange cells (1a-1d) of the set, the casing (5) having a constant axial extension as the thermal power of the cell (1a-1d) varies within the range of thermal power values and equal to the axial extension of the cell having the minimum thermal power within the range of thermal power values; b) providing a plurality of helically-shaped heat exchangers (2) each having a thermal power falling within said range of minimum and maximum values and each comprising at least (Continued)

one tubular duct (3) for the flow of a first heat transfer fluid coiled about a longitudinal axis (X-X) of the helix according to a plurality of coils; c) mounting within said single containment casing (5) at least one helically-shaped heat exchanger (2) of the plurality of heat exchangers (2) of the set; wherein the plurality of heat exchangers (2) of the set has an internal diameter that is substantially constant as the thermal power of the heat exchanger (2) varies within the range of thermal power values; and wherein the tubular duct (3) of the heat exchanger (2) has a radial extension of the coils proportional to the thermal power of the heat exchanger (2) and such to maintain substantially constant the axial extension of the heat exchanger (2) as its thermal power varies and equal to the axial extension of the heat exchanger (2) having the minimum thermal power within the range of thermal power values of the set.

27 Claims, 5 Drawing Sheets

(51) Int. Cl.
  *F28D 7/02* (2006.01)
  *F28F 1/02* (2006.01)
  *B23P 15/26* (2006.01)

(58) Field of Classification Search
  USPC .................................................. 165/156
  See application file for complete search history.

(56) References Cited

U.S. PATENT DOCUMENTS

| | | | |
|---|---|---|---|
| 2007/0209606 A1 | 9/2007 | Tetsurou | |
| 2009/0114732 A1* | 5/2009 | Hawkins | F24D 5/12 237/12 |
| 2009/0301700 A1* | 12/2009 | German | B21D 53/04 165/160 |
| 2012/0111542 A1* | 5/2012 | Fridy | F28D 1/0391 165/104.26 |
| 2014/0202442 A1* | 7/2014 | Haydock | F24H 8/00 126/112 |

FOREIGN PATENT DOCUMENTS

| | | |
|---|---|---|
| EP | 1281919 | 2/2003 |
| FR | 2846075 | 4/2004 |
| JP | 2005321172 | 9/2007 |
| WO | WO 9416272 | 7/1994 |
| WO | WO 2004036121 | 4/2004 |
| WO | WO 2005080900 | 9/2005 |
| WO | WO 2012156954 | 11/2012 |

* cited by examiner

METHOD OF MANUFACTURING A SET OF HEAT EXCHANGE CELLS AND SET OF HEAT EXCHANGE CELLS THUS OBTAINED

This application is a United States national phase filing of PCT/IB2015/051951, filed Mar. 17, 2015, which claims priority to PCT/IB2014/059898, filed Mar. 17, 2014, both of which are hereby incorporated by reference herein in their entireties.

BACKGROUND OF THE INVENTION

The present invention relates to a method of manufacturing a set of heat exchange cells having a thermal power falling within a predetermined range of minimum and maximum values.

In particular, the invention relates to a method of manufacturing a set of heat exchange cells wherein each cell comprises at least one heat exchanger mounted in a respective containment casing, which set of cells has a preferred although non-exclusive use in water heating apparatuses, in heating or air conditioning systems, for both domestic use and for use in complexes of dwelling-houses, industrial areas or shopping areas.

The invention also relates to a set of heat exchange cells of the type indicated above and obtainable by the above method.

In the following description and in the appended claims, the term: "heat exchange cell" is used to indicate a unit, preferably of a modular type, comprising at least one heat exchanger mounted in a respective containment casing and configured to carry out a heat exchange between a first heat transfer fluid circulating within the heat exchanger, and a second heat transfer fluid flowing in the containment casing externally to the heat exchanger itself.

RELATED ART

In the field of heat exchange cells in general and in particular for water heating apparatuses or for heating or air conditioning systems, one of the needs which is currently most felt is that of providing the manufacturer of such apparatuses or systems with a set of thermal powers as wide as possible which are on the one hand capable to meet the different needs of the users and, on the other hand, have extremely reduced dimensions.

Currently, heat exchange cells particularly appreciated for their characteristics of compactness, competitive weight and cost are those equipped with a helically-shaped heat exchanger housed in a respective containment casing.

In particular, such a helically-shaped heat exchanger comprises at least one tubular duct coiled about a longitudinal axis of the helix according to a plurality of coils having a cross-section of a value determined according to the desired thermal power.

The coils of such a tubular duct may have either a flat cross-section, such as for example described in International patent application WO 94/16272 in the name of Le Mer or in European patent application EP 0 745 813 in the name of Viessmann Werke, or a circular cross-section, such as for example described in International patent applications WO 2005/080900 and WO 2012/156954 in the name of Cosmogas.

In both cases, it is common practice for the manufacturers of these heat exchange cells to manufacture each heat exchange cell of the set by mounting in a respective dedicated containment casing one or more helically-shaped heat exchangers having a predefined number of coils proportional to the desired thermal power falling within the range of minimum and maximum values of the set.

Within the framework of the configuration of heat exchange cells in which the coils of the tubular duct of the helically-shaped heat exchanger have a flat cross-section, it is also known, as described for example in U.S. patent application No. 2007/0209606, to divide the heat exchanger by means of an internal partition element in a front part and a rear part, respectively upstream and downstream of the partition element with respect to the direction of flow of the second heat transfer fluid.

In an embodiment, shown in FIG. 9 of U.S. 2007/0209606 and in order to increase the heat exchange efficiency, the radial extension of the coils of the rear part of the heat exchanger—involved by a gas flow (second heat transfer fluid) having a lower temperature—is greater than the radial extension of the coils of the front part.

SUMMARY OF THE INVENTION

The Applicant has observed that by operating as suggested by the aforementioned prior art documents, the manufacture of a set of heat exchange cells having a thermal power falling within a predetermined range of minimum and maximum values has some drawbacks for which an adequate solution is yet to be provided.

A first drawback is related to the fact that as the thermal power of the cell increases, the number of coils of the heat exchanger also increases and, along therewith, the extension along the axial direction at least of the heat exchanger in parallel to the longitudinal axis of the helix.

In the case of the cells described in International patent application WO 94/16272 or in European patent application EP 0 745 813, such an increase of the extension along the axial direction of the heat exchanger, however, involves an increase of the axial extension of the casing of the cell in which the heat exchanger is housed as the thermal power of the cell varies within the range of minimum and maximum values of the thermal power of the set of cells.

By operating in this way, namely by making a set of heat exchange cells providing for each selected value of thermal power a dedicated heat exchanger having an appropriate axial extension, housed in an equally dedicated containment casing and having such dimensions as to accommodate the necessary number of coils of the heat exchanger, it ensues that the set of heat exchange cells thus obtained necessarily comprises a relatively high number of cells having different overall sizes, especially along the axial direction, with all the negative consequences ensuing therefrom.

In the first place, such a set of heat exchange cells requires manufacturing and having in stock a large number of dedicated containment casings of different sizes, each of which is capable of housing a heat exchanger having the desired thermal power, with the evident negative consequences in terms of cost and use of space in the warehouse.

Secondly, the increase of the axial dimensions of the heat exchange cell along with the increase of thermal power, conflicts with the market demands that tend both to minimize and unify the dimensions of heat exchange devices.

Thirdly, the increase of the axial dimensions of the heat exchange cell along with the power increase forces in many cases to complicate the hydraulic circuit of the apparatus or system in which the heat exchange cell is mounted to take into account the different interaxial distance between the inlet connection and the outlet connection of the first heat transfer fluid circulating in the heat exchanger of the cell.

In the case of the cells described in International patent application WO 2012/156954 in which it is possible to envisage a single containment casing as the thermal power of the cell increases, the extension increase along the axial direction of the heat exchanger as its thermal power increases involves on the other hand that the aforementioned single containment casing of the cell must necessarily have an axial extension equal to that of the casing of the cell having the maximum thermal power within the range of thermal power values of the set.

This inevitably leads both to the use of a casing that occupies more space than would be desirable and that is not used in all those cells of the set having a thermal power lower than the maximum, and to a greater production cost of the set of cells due to the greater amount of material used to manufacture the casing.

The technical problem underlying the present invention is therefore that of providing a set of heat exchange cells having a thermal power falling within a predetermined range of minimum and maximum values and which is at least partially free from the above drawbacks and in particular which allows, as the thermal power varies within the set, to:

have a constant axial dimension of the single containment casing of the plurality of heat exchange cells of the set;

have the minimum axial dimension of the single containment casing of the plurality of cells of the set;

standardize the components of the cell that close the feeding zone of the second heat transfer fluid or that are arranged in such a zone;

standardize the external support elements of the single containment casing of the plurality of heat exchange cells of the set belonging to the apparatus or system in which the single cell of the set is installed; and have the minimum axial dimension of the external support elements of the single containment casing of the plurality of cells of the set.

According to a first aspect thereof, the invention relates to a method as defined in appended claim 1; preferred features of the method are set forth in dependent claims 2-11.

More particularly, the invention relates to a method of manufacturing a set of heat exchange cells having a thermal power falling within a predetermined range of minimum and maximum values, each heat exchange cell comprising at least one heat exchanger mounted in a respective containment casing, wherein the method comprises the steps of:

a) providing a single containment casing of a plurality of heat exchange cells of the set, said casing having a constant axial extension as the thermal power of the cell varies within said range of thermal power values and equal to the axial extension of the cell having the minimum thermal power within said range of thermal power values;

b) providing a plurality of helically-shaped heat exchangers each having a thermal power falling within said range of minimum and maximum values and each comprising at least one tubular duct for the flow of a first heat transfer fluid coiled about a longitudinal axis of the helix according to a plurality of coils;

c) mounting within said single containment casing at least one helically-shaped heat exchanger of said plurality of heat exchangers of the set;

wherein said plurality of heat exchangers of the set has an internal diameter that is substantially constant as the thermal power of the heat exchanger varies within said range of thermal power values; and wherein said at least one tubular duct of the at least one heat exchanger has a radial extension of the coils proportional to the thermal power of the heat exchanger and such to maintain substantially constant the axial extension of the heat exchanger as its thermal power varies and equal to the axial extension of the heat exchanger having the minimum thermal power within said range of thermal power values of the set.

In the following description and in the appended claims, the term: "thermal power" is used to indicate the amount of energy transferred per unit time in terms of heat between the first heat transfer fluid circulating in the heat exchanger and the second heat transfer fluid circulating externally thereto.

In a way known per se, the helically-shaped tubular duct of the helically-shaped heat exchangers of the set defines coaxially and internally with respect to the heat exchanger a feeding zone of a second heat transfer fluid.

Within the framework of the present description and of the subsequent claims, the term: heat transfer fluid, is used to indicate any fluid capable of receiving/transferring heat from/to external heat sources and of transferring the heat to different points of an apparatus or system in which the fluid circulates.

Thus, for example, in the case of gas-liquid heat exchange cells, the first heat transfer fluid may consist of water to be heated (such as in boilers for domestic use) and the second heat transfer fluid may consist of hot combustion gases coming from a burner, or the first heat transfer fluid may consist of a compressed gas or other fluid at relatively high temperature and the second heat transfer fluid may consist of cold air coming from a suitable circulation apparatus (such as in air conditioning systems).

Alternatively, and in the case of liquid-liquid heat exchange cells, the first heat transfer fluid may consist of a liquid at a lower temperature which must be heated and the second heat transfer fluid may consist of a warmer heating liquid, such as in water heating apparatuses for domestic use for the production of hot sanitary water. In this case, therefore, the heat exchange cell substantially acts as a liquid-liquid heat exchange apparatus.

Within the framework of the present description and of the subsequent claims, the term "proportional", when referred to two or more entities related to each other, is used to indicate that a relationship exists between these entities such that upon variation of one of them, the other or others vary in a corresponding manner.

Thus, for example, when an entity is said to "vary proportionally" or to be "proportional" to the thermal power, it is meant that between such an entity (such as the radial extension or the cross-section of the coils of the heat exchanger) and the thermal power there is a relationship such that upon variation of the thermal power, the entity considered varies in a corresponding manner.

Preferably, within the framework of the invention, the relationship between two or more entities is of direct proportionality.

For the purposes of the invention, the relationship of proportionality between the thermal power of said at least one heat exchanger (and therefore of the cell) and, for example, the radial extension or the cross-section of the coils can also be not of the direct type, according to a law of proportionality that can be determined case by case by a person skilled in the art according to specific manufacturing and/or application requirements of the cell.

Within the framework of the present description and of the subsequent claims, the various "axial", "longitudinal", "transversal" or "radial" directions or orientations of the cell or of the elements thereof are intended to be referred to the longitudinal axis of the heat exchanger helix, if not otherwise indicated.

In the operating configuration of the heat exchange cell, such a longitudinal axis may be horizontal or vertical; it follows that the various directions or orientation of the cell or of the elements thereof should be considered in relation to the orientation of the longitudinal axis of the heat exchanger helix.

In the following description and for the sake of simplicity, reference will conventionally be made, without any limiting intent, to an operative position of the cells of the set of heat exchange cells in which the longitudinal axis of the heat exchanger is horizontal.

Within the framework of the present description and of the subsequent claims, finally, all numbers expressing amounts, quantities, percentages, and so forth, are to be understood as being preceded in all instances by the term "about" except where otherwise indicated. Also, all ranges of numerical entities include all the possible combinations of the maximum and minimum numerical values and all the possible intermediate ranges therein, in addition to those specifically indicated hereinbelow.

For the purposes of the invention, the containment casing of the heat exchange cell can be made of any structural material suitable for this type of use, for example aluminium, steel or high performance plastics with properties of resistance to chemicals, flame and water vapour, such as for example polyphenylene sulphide (PPS).

For the purposes of the invention, the aforementioned heat exchanger may be made of any material, preferably a metal, having a high thermal conductivity that is commonly used for heat exchange purposes, such as aluminium or steel.

According to the present invention, the Applicant has perceived that the aforementioned desired combination of features in terms of axial dimensions of the single containment casing of the plurality of cells of the set, of axial dimension of the support elements of such a casing and of standardization of the components and of the support elements of the single containment casing of the plurality of cells of the set as the thermal power varies, can be achieved—obtaining a heat exchange efficiency equal to or higher than that of the heat exchange cells of known type having a variable axial extension at the same thermal power—by suitably combining a series of features of the cells belonging to the set.

More specifically, the Applicant has observed that:
a) by providing a single containment casing having an axial extension that is constant and equal to the axial extension of the cell having the minimum thermal power within the range of thermal power values of the set,
b) by providing a plurality of helically-shaped heat exchangers having an internal diameter substantially constant as the thermal power of the heat exchanger varies within said range of thermal power values,
c) by mounting within the aforementioned single containment casing at least one heat exchanger of the aforementioned plurality of heat exchangers of the set, and
d) by imparting to the tubular duct of the heat exchanger a radial extension of the coils proportional to the thermal power of the heat exchanger and such as to maintain substantially constant the axial extension of the heat exchanger as its thermal power varies and equal to the axial extension of the heat exchanger having the minimum thermal power within said range of thermal power values of the set, it is possible to maintain constant and at the minimum possible value the axial extension both of the heat exchanger and of the single containment casing that houses the same as the thermal power of the cell varies within the range of thermal power values of the set and, at the same time, to obtain a high standardization both of the components of the cells different from the heat exchanger, and of the external support elements of the single containment casing of the cells.

The desired thermal power increase of the helically-shaped heat exchanger of the heat exchange cell of the set, in fact, is achieved within the latter maintaining constant and equal to the minimum possible value the axial extension of both the heat exchanger and of the single containment casing containing the same as the thermal power varies, by selecting a duct having a cross-section adequate for the circulation of a suitable flow rate of the first heat transfer fluid and by varying the radial extension of the coils so as to obtain an expansion or a reduction along the transversal direction of the heat exchanger as the thermal power increases or decreases.

In other words, the Applicant has perceived that by operating in this way it is possible to increase or decrease the thermal power of the helically-shaped heat exchanger without altering the axial extension thereof and, therefore, without consequently having to alter the axial extension of the casing of the heat exchange cell, which remains the minimum possible, within the maximum and minimum values of the thermal powers of the set.

The Applicant has also perceived that by operating in this way it is also possible to achieve a high standardization of the external support elements of the single containment casing of the plurality of heat exchange cells of the set and belonging to the apparatus or to the system in which the specific cell of the set is installed, since the axial dimension of the single containment casing remains constant and equal to the minimum possible as the thermal power varies.

The desired high standardization of the components of the cell different from the heat exchanger, finally, is obtained within the set by maintaining substantially constant both the axial extension and the internal diameter of the heat exchangers of the set as their thermal power varies within the range of thermal power values of the set.

In this way, within the single containment casing of the plurality of cells of the set and coaxially and internally with respect to the heat exchanger, a feeding zone of the second heat transfer fluid is defined having substantially constant dimensions both along the axial direction and along the radial direction as the thermal power varies.

This feature advantageously allows to standardize the components of the plurality of cells of the set different from the heat exchanger, such as for example the thermally insulating elements facing the feeding zone of the second heat transfer fluid, generally placed inside the heat exchanger in a front and in a rear zone of the containment casing, the front closing wall of the casing, the burner and the corresponding accessories or the feeding duct of a hot fluid, where present.

The claimed combination of features therefore allows to achieve the following advantages:
to have a plurality of heat exchangers having a minimum axial dimension that is substantially constant as their thermal power varies so as to be housed within a single containment casing—having in turn a minimum axial dimension—of all of the heat exchangers of the plurality of cells of the set;

to have the possibility of maintaining substantially constant the interaxial distance between the inlet connection and the outlet connection of the fluid circulating in the heat exchanger of the heat exchange cell;

to have the possibility of simplifying the offer of products and the warehouse management of the same;

to have a set of heat exchange cells with unified size which accordingly unifies the size of the heating apparatuses or systems in which each cell of the set is inserted and which simplifies the components lay-out of the aforementioned heating apparatuses or systems;

to have a feeding zone of the second heat transfer fluid inside such a single casing having substantially constant dimensions, both along the axial direction and along the transversal direction such as to allow a very high standardization of the components of the set of heat exchange cells as the thermal power varies.

According to a second aspect thereof, the present invention relates to a set of heat exchange cells as defined in appended claim 12; preferred features of the set of cells are set forth in dependent claims 13-20.

More particularly, the invention relates to a set of heat exchange cells having a thermal power falling within a predetermined range of minimum and maximum values, each heat exchange cell comprising at least one helically-shaped heat exchanger of a plurality of heat exchangers of the set and having a thermal power falling within said range of minimum and maximum values;

wherein the set comprises a single containment casing of a plurality of heat exchange cells of the set in which said at least one helically-shaped heat exchanger of said plurality of heat exchangers of the set is mounted;

wherein each helically-shaped heat exchanger of said plurality of heat exchangers of the set comprises at least one tubular duct for the flow of a first heat transfer fluid coiled about a longitudinal axis of the helix according to a plurality of coils;

wherein said plurality of heat exchangers of the set has an internal diameter that is substantially constant as the thermal power of the heat exchanger varies within said range of thermal power values;

wherein said at least one tubular duct of the heat exchanger of said plurality of heat exchangers of the set has a radial extension of the coils proportional to the thermal power of the heat exchanger and such to maintain substantially constant the axial extension of the heat exchanger as its thermal power varies and equal to the axial extension of the heat exchanger having the minimum thermal power within said range of thermal power values; and wherein said single containment casing of the set has an axial extension which is constant as the thermal power of the cell varies and equal to the axial extension of the cell having the minimum thermal power within said range of thermal power values.

Advantageously, the set of heat exchange cells of the invention achieves the technical effects described above in relation to the manufacturing method thereof.

The present invention in at least one of the above aspects may have at least one of the following preferred features; the latter may in particular be combined with each other as desired to meet specific application requirements.

Preferably, the number of coils of each heat exchanger of the aforementioned plurality of heat exchangers of the set is equal to the number of coils of the heat exchanger having the minimum thermal power within the aforementioned range of thermal power values of the set.

In this way, it is advantageously possible to achieve the desired and constant axial extension of the heat exchangers of the set while maintaining substantially unchanged, as the thermal power varies, the configuration of the elements of the cell which cooperate in abutment relationship and in a fluid-tight manner with the opposite axial ends of the heat exchanger.

For example, such elements can be the front wall and the rear wall of the containment casing of the cell or other abutment elements positioned inside the containment casing.

Preferably, the mounting configuration of the heat exchanger within the single containment casing of the set of cells is such as to define in such a casing a feeding zone of the second heat transfer fluid that advantageously allows to have within the heat exchange cell a flow of the second heat transfer fluid that goes from the feeding zone along a substantially radial or axial-radial direction outwardly through the helically-shaped heat exchanger.

Advantageously, this preferred mounting configuration of the heat exchanger within the single containment casing of the set of cells is that envisaged by the substantial totality of gas-liquid heat exchange cells provided with helically-shaped heat exchangers, in particular when the second heat transfer fluid is a hot combustion gas coming from a burner or a cold gas coming from a suitable circulation apparatus and the first heat transfer fluid is a liquid to be heated or cooled.

Preferably, the set of heat exchange cells comprises from two to eight, preferably from two to six, and still more preferably from two to four heat exchange cells having an increasing thermal power within said predetermined range of minimum and maximum values.

In this way, it is advantageously possible to achieve a high flexibility in the offer of thermal powers to the end user, combined with the maximum reduction in the number of casings required if a single containment casing is used for all the heat exchangers having a different thermal power of the set.

Preferably, the set of heat exchange cells has a thermal power selected from one of the following ranges of minimum and maximum values: a first range from 1 to 12 kW, preferably from 2 to 10 kW, a second range from 15 to 35 kW, preferably from 16 to 32 kW, a third range from 35 to 65 kW, preferably from 40 to 62 kW, and a fourth range greater than 65 kW, preferably from 70 to 115 kW.

Within the framework of the present description and of the subsequent claims, said first and second range of minimum and maximum thermal power values of the range will be collectively referred to as indicative of a "low" thermal power, said third range of values as indicative of a "medium" thermal power and said fourth range of values as indicative of a "high" thermal power.

In a preferred embodiment, step a) of providing a single containment casing of said plurality of heat exchange cells of the set is carried out by providing a containment casing having a predetermined and constant size as the thermal power of the cell varies within said range of minimum and maximum values of thermal power.

In the following description and in the appended claims, the term: "size" of the containment casing or of the heat exchanger of the cell is used to indicate—unless specified otherwise—the space occupied by the same along the axial (i.e., longitudinal) direction and transversely to the axial direction or to the longitudinal axis of the heat exchanger, for example, in height and width if the containment casing is substantially prismatic in shape or along the radial direction if the containment casing is substantially cylindrical in shape.

In a preferred embodiment, the set includes a single containment casing of all the heat exchange cells of the set.

In this way, the axial extension of the containment casing of the heat exchange cell is therefore advantageously unified for all the values of thermal power of the set. It is therefore advantageously possible to achieve noticeable simplifications in terms of number of elements to be manufactured, stored and mounted in the apparatus or system of the end user.

Within the framework of this preferred embodiment, the transversal extension of said single containment casing of the set of heat exchange cells is still more preferably such to define within the casing a housing seat configured to contain the heat exchanger of maximum radial size within the set of cells.

In this way, it is advantageously possible to use a single containment casing for all the heat exchangers of the set and having a unified overall size, achieving the additional advantages of having a high flexibility in the offer of thermal powers to the end user combined with the possibility of unifying the size of the thermal apparatus or systems in which each cell of the set is inserted and with the possibility of simplifying the lay-out of the components of the aforementioned thermal apparatuses or systems.

In a preferred embodiment, the axial extension of said single containment casing of the set is selected from one of the following ranges of minimum and maximum values: a first range from 80 to 190 mm, preferably from 120 to 180 mm for said first and second ranges of thermal power of the cell (low power), a second range from 200 to 360 mm, preferably from about 320 to 350 mm for said third range of thermal power of the cell (medium power), a third range from 360 to 660 mm, preferably from 400 mm to 660 mm, for said fourth range of thermal power of the cell (high power).

In this way, it is advantageously possible—with a containment casing of the set having the minimum axial extension compatible with the desired thermal powers—to achieve the advantages of having a high flexibility in the offer to the end user of the three sets of thermal power most required for the uses generally expected in the domestic field, in complexes of dwelling-houses and in the field of commercial and industrial areas. All this combined with the use of a containment casing having a unified axial extension for each of the above power sets, a casing that in turn allows to standardise the overall size of the thermal apparatuses or systems in which each cell of the above sets is installed and to simplify the layout of the components of the aforementioned heating apparatuses or systems.

In a preferred embodiment, said single containment casing of the heat exchanger has a transversal size (i.e., the space occupied by the casing transversally to the longitudinal axis of the heat exchanger), except for the size of a possible discharge cap of the second heat transfer fluid, comprised within one of the following ranges of minimum and maximum values: a first range from 100 to 220 mm, preferably from 140 to 200 mm for said first range of thermal power of the cell, a second range from 220 to 300 mm, preferably from 240 to 290 mm for said second range of thermal power of the cell, a third range from 300 to 400 mm, preferably from about 310 to 350 mm for said third range of thermal power of the cell, a fourth range from 400 to 660 mm, preferably from 430 to 600 mm for said fourth range of thermal power of the cell.

In this way, it is advantageously possible—with a containment casing of the set having the minimum overall size compatible with the desired thermal powers—to extend the aforementioned advantages of having a high flexibility in the offer to the end user of the three ranges of thermal power most required for the uses generally expected, by using a single very compact containment casing having a unified size for each of the above power sets. Such a unified size of the containment casing of the set allows in turn to standardise the size of the heating apparatuses or systems in which each cell of the aforementioned sets is inserted and to simplify the lay-out of the components of the aforementioned heating apparatuses or systems.

Preferably, the internal diameter of the plurality of helically-shaped heat exchangers of the set is substantially constant as the thermal power varies and is equal to the internal diameter of the heat exchanger having the minimum thermal power within the aforementioned range of thermal power values of the set.

In this way, it is advantageously possible to have a feeding zone of the second heat transfer fluid having a minimum dimension along the radial direction with the advantages deriving therefrom in terms of compactness both of the plurality of heat exchangers of the set and of the single containment casing of the set of cells that contains the same.

Preferably, the internal diameter of the plurality of helically-shaped heat exchangers of the set is constant and varies within a range of values comprised between 60 and 540 mm as a function of the thermal power of the heat exchanger and, therefore, of the heat exchange cell containing the same.

Preferably, the helically-shaped heat exchanger has an inner diameter of the helix comprised within one of the following ranges of minimum and maximum values: a first range from 60 to 120 mm, preferably from 70 to 110 mm for said first range of thermal power of the cell, a second range from 120 to 190 mm, preferably from 150 to 180 mm for said second range of thermal power of the cell, a third range from 190 to 260 mm, preferably from 200 to 250 mm for said third range of thermal power of the cell, a fourth range from 260 to 540 mm, preferably from 290 to 480 mm for said fourth range of thermal power of the cell.

Preferably, said at least one tubular duct of the heat exchanger has a cross-section of the coils proportional to the thermal power of the heat exchanger itself.

In this way, it is advantageously possible to obtain a relationship of proportionality between the flow rate of the first heat transfer fluid flowing within the at least one tubular duct of the heat exchanger and the thermal power of the heat exchanger itself.

This relationship of proportionality advantageously allows to achieve the following technical effects.

A first advantageous technical effect is that of having substantially constant pressure drops as the thermal power of the heat exchanger varies with consequent benefits in terms of choice of the circulating device of the first heat transfer fluid (e.g. a pump) and of the related operating cost.

A second advantageous technical effect is that of having a substantially constant speed of the first heat transfer fluid with a consequent greater flexibility of use and adaptation to the various types of heating or air-conditioning systems in which the heat exchange cells of the set is installed.

In a preferred embodiment, said step b) of providing the aforementioned plurality of helically-shaped heat exchangers comprises the steps of:

i) providing a tubular duct having a cross-section of fluid flow of a predetermined value and proportional to the thermal power to be delivered;

ii) shaping said tubular duct to a helical shape so as to obtain a plurality of coils.

In this way, it is advantageously possible to provide for each cell of the set a respective heat exchanger of said plurality of heat exchangers which meets the aforementioned preferred relationship of proportionality between the flow rate of the first heat transfer fluid flowing within the at least one tubular duct of the heat exchanger and the thermal power of the heat exchanger so as to have substantially constant pressure drops and flowing speed of the first heat transfer fluid as the thermal power of the heat exchanger varies, with the benefits highlighted above.

In a preferred embodiment, the coils of said plurality of coils of said at least one tubular duct of the heat exchanger of said plurality of heat exchangers have a flat cross-section a major axis of which is substantially perpendicular to the longitudinal axis of the helix, or forms an acute angle with respect to said axis.

In this way, it is advantageously possible to achieve an optimal heat exchange between the first and the second heat transfer fluid while having at the same time a limited axial (i.e. longitudinal) extension of the heat exchanger.

In a preferred embodiment, and regardless of the shape of the cross-section of the tubular duct of the heat exchanger, the cell comprises suitable spacer elements known per se, for example ribs extending from the flat faces of the duct, such as for example described in International patent application WO 2005/080900 in the case of a circular cross-section or WO 94/16272 in the case of a flat cross-section, or comb-shaped spacer elements interposed between said flat faces, such as for example described in U.S. patent application No. 2007/0209606.

Advantageously, said spacer elements are configured to define between the flat faces of the duct an interstice having a predetermined and preferably constant width, forming a fluid path for the flow of the second heat transfer fluid in a substantially radial or axial-radial direction.

Within the framework of the present description and of the following claims, the term: "width" of the interspace defined between the flat faces of the duct of the heat exchanger is used to indicate the distance between said faces measured along a direction perpendicular thereto.

In a preferred embodiment, and if the coils of the tubular duct of the heat exchanger have a flat cross-section, step b) of providing the aforementioned plurality of helically-shaped heat exchangers further comprises the step of plastically deforming the coils along a radial or axial/radial direction so as to obtain said plurality of coils having a flat cross-section a major axis of which is substantially perpendicular to the longitudinal axis of the helix or forms an acute angle with respect to said axis.

Preferably, said plastic deformation step is carried out in such a way as to maintain substantially constant both said cross-section of fluid flow of the tubular duct and the axial extension of the heat exchanger of the aforementioned plurality.

In this way, it is advantageously possible both to achieve an optimum heat exchange between the first and the second heat transfer fluid while having at the same time a limited axial (i.e. longitudinal) extension of the plurality of heat exchangers, and to obtain the aforementioned relationship of proportionality between the flow rate of the first heat transfer fluid flowing within the at least one tubular duct of the heat exchanger and the thermal power of the heat exchanger.

In an alternative preferred embodiment and if the coils of the tubular duct of the heat exchanger have a flat cross-section, step b) of providing the aforementioned plurality of helically-shaped heat exchangers preferably comprises the steps of:

iii) providing a tubular duct having a flat cross-section of fluid flow of a predetermined value and proportional to the thermal power;

iv) shaping said tubular duct to a helical shape so as to obtain a plurality of coils having a flat cross-section a major axis of which is substantially perpendicular to the longitudinal axis of the helix, or forms an acute angle with respect to said axis, wherein said helical shaping step is carried out so as to maintain substantially constant the axial extension of the heat exchanger of said plurality of heat exchangers as the thermal power thereof varies.

A preferred way for carrying out the aforementioned step iii) envisages to carry out the steps of:

providing a tubular duct having a circular cross-section of fluid flow of a predetermined value and proportional to the thermal power; and plastically deforming said tubular duct to a helical shape so as to obtain a flat cross-section.

These steps may be carried out by means of the techniques and systems described, for example, in International patent application WO 94/16272.

Alternatively, it is also possible to carry out the aforementioned step iii) starting from a strip of a suitable metal material and then forming by longitudinal welding, such as laser welding, a tubular duct having a flat cross-section.

Also in this case, it is advantageously possible both to achieve an optimum heat exchange between the first and the second heat transfer fluid while having at the same time a limited axial (i.e. longitudinal) extension of the heat exchangers of the aforementioned plurality of heat exchangers, and to obtain the aforementioned relationship of proportionality between the flow rate of the first heat transfer fluid flowing within the at least one tubular duct of the heat exchanger and the thermal power of the heat exchanger of the aforementioned plurality of heat exchangers.

In a preferred embodiment and if the coils of the tubular duct of the heat exchanger have a flat cross-section, the ratio between the inner width and the inner height of each coil of the duct of the helically-shaped heat exchangers of the aforementioned plurality of heat exchangers, respectively measured in parallel to a major axis and to a minor axis of the cross-section of said tubular duct, has a value proportional to the thermal power of the heat exchanger.

In this way, it is advantageously possible to achieve an optimal heat exchange between the first and the second heat transfer fluid proportional to the thermal power of the heat exchangers, since as the latter increases it also increases the extension along the radial direction of the fluid path for the flow of the second heat transfer fluid defined in the interstice between the flat faces of the coils formed by the tubular duct of the helically-shaped heat exchanger.

Preferably, such a ratio has a value greater than 2.5 and more preferably, it is comprised between 2.5 and 5, as a function of the thermal power of the heat exchanger.

In particular, the Applicant has experimentally observed—within the framework of a preferred embodiment in which the cells of the set are heat exchange cells between the combustion gases leaving a burner (second heat transfer fluid) and water to be heated (first heat transfer fluid)—that when the ratio between the inner width and the inner height of each coil of the duct of the heat exchanger is greater than 2.5, it is advantageously possible to reduce the temperature of the combustion gases radially leaving the heat exchanger to values lower than those of the heated water (generally between 40° and 80° C.) leaving the cell.

These low values of the temperature of the combustion gases advantageously allow to reduce the thermal stress which the material that constitutes the containment casing of the cell is subjected to, extending the operating life thereof and allowing the use of non-metal materials, such as for example plastics and, this, without the need of preparing metal protection ferrules about the heat exchanger such as for example described in International patent application WO 2004/036121 in the name of Giannoni France.

In a preferred embodiment, the helically-shaped heat exchangers of the aforementioned plurality of heat exchangers comprise a single tubular duct forming a single coil.

In an alternative preferred embodiment, the helically-shaped heat exchangers of the aforementioned plurality of heat exchangers comprise a plurality of tubular ducts, optionally axially adjacent and/or associated to each other.

Preferably, this plurality of tubular ducts forms a single coil.

Preferably, the winding pitch of the aforementioned single coil is constant.

In this way, it is advantageously possible to facilitate the manufacturing operations and reduce the production costs of the heat exchangers of the set.

In a preferred embodiment, step a) of providing the single containment casing of the plurality of heat exchange cells of the set comprises providing at least one pair of sleeves extending from a peripheral side wall of the single containment casing and having a constant interaxial distance as the thermal power of the cell varies within said range of thermal power values.

In this preferred embodiment, step c) of mounting within the single containment casing the aforementioned at least one helically-shaped heat exchanger of the aforementioned plurality of heat exchangers of the plurality of heat exchange cells of the set comprises positioning opposite ends of the aforementioned at least one tubular duct of the heat exchanger in a respective sleeve of the aforementioned pair of sleeves.

Preferably, the set of heat exchange cells obtained in this way therefore comprises a single containment casing of the plurality of heat exchange cells of the set and a heat exchanger having the aforementioned preferred features.

In this way, it is advantageously possible to maintain substantially constant the interaxial distance between the inlet connection and the outlet connection of the fluid circulating in the heat exchanger of the heat exchange cell also in the case in which the ends of the tubular duct of the heat exchanger protrude from the peripheral side wall of the single containment casing of the plurality of heat exchange cells of the set, according to a configuration used in a large number of heat exchange cells.

BRIEF DESCRIPTION OF THE FIGURES

Additional features and advantages of the invention will be better apparent from the following description of a preferred embodiment of a set of heat exchange cells and of a method of manufacturing the same according to the present invention, made hereinafter by way of illustrative and non-limiting example with reference to the accompanying drawings. In such drawings:

FIG. 3 is a rear elevational view of the cell of FIG. 1, FIGS. 4a-4d are schematic cross-section views, taken along line IV-IV of FIG. 2, of respective heat exchange cells of the set having a progressively increasing thermal power within a predetermined range of minimum and maximum values of the set;

DETAILED DESCRIPTION OF CURRENTLY PREFERRED EMBODIMENTS OF THE INVENTION

In the following description, identical reference numerals are used for the illustration of the figures to indicate construction elements having the same function. For clarity of illustration, some reference numerals are not repeated in all the figures.

Figure 1:
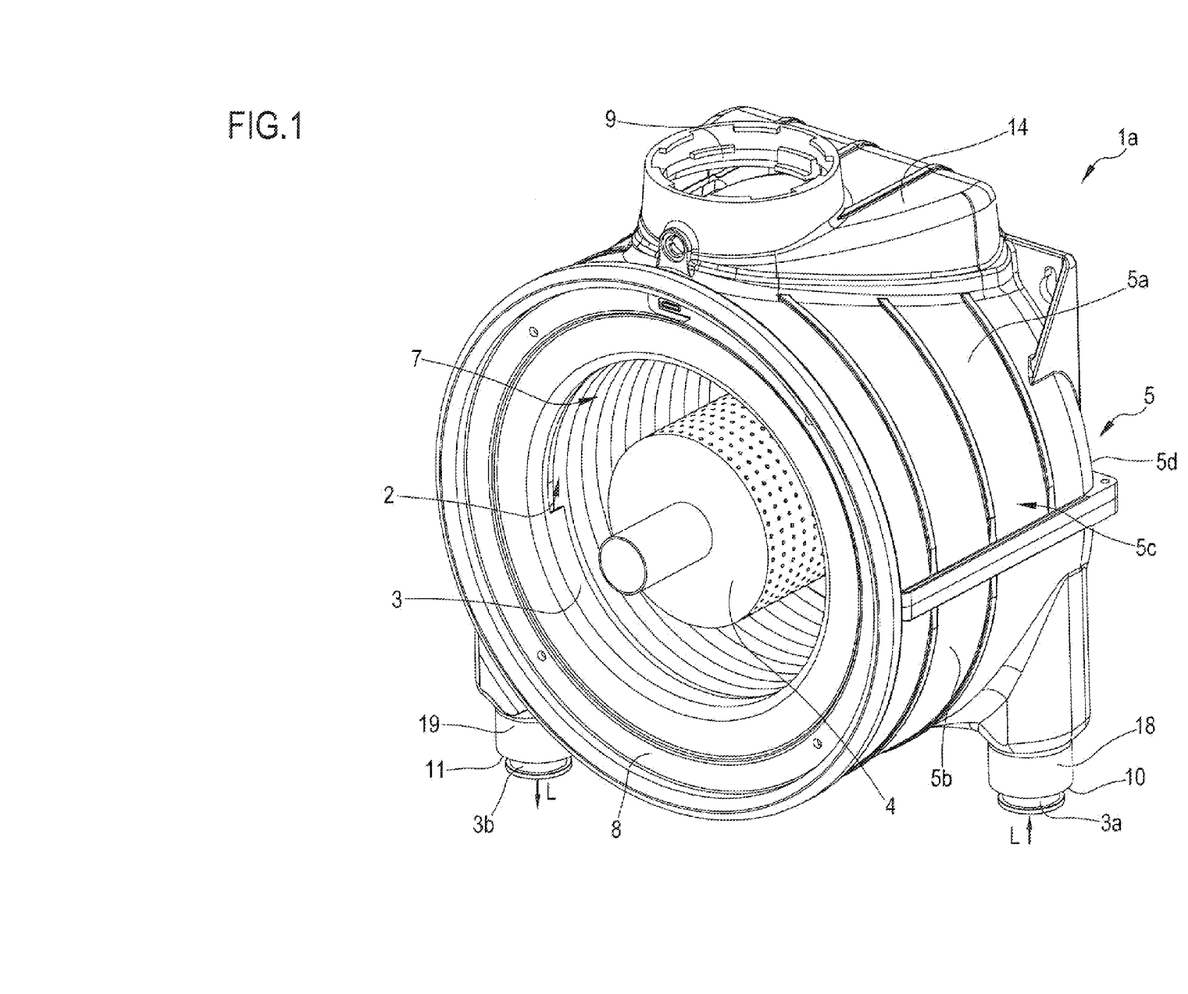
FIG. 1 is a perspective view of a preferred embodiment of a heat exchange cell of a set of heat exchange cells according to a preferred embodiment of the present invention.
Figure 2:
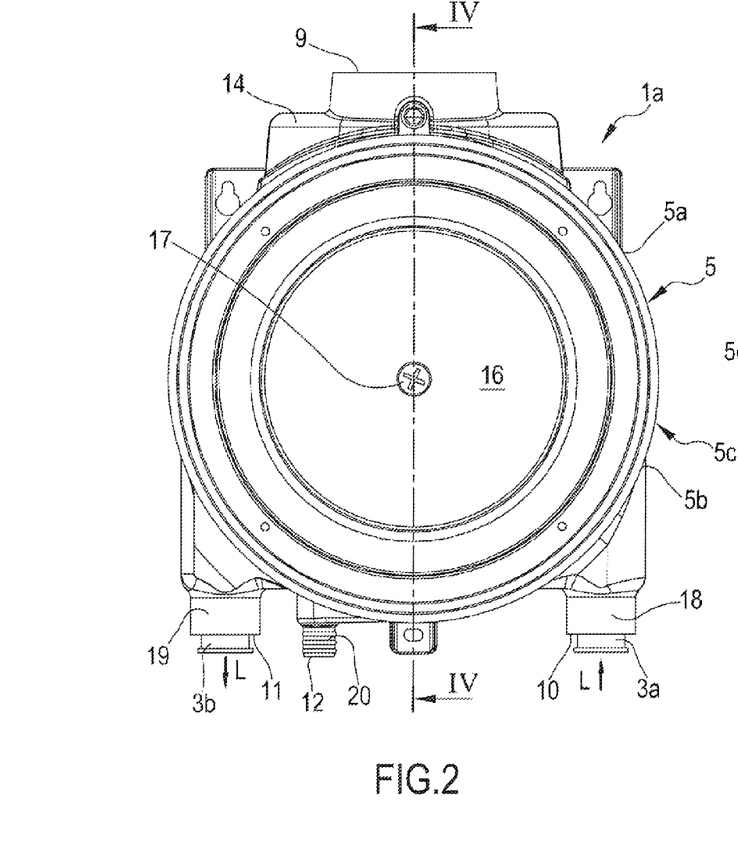
FIG. 2 is a front elevational view of the cell of FIG. 1.
Figure 3:
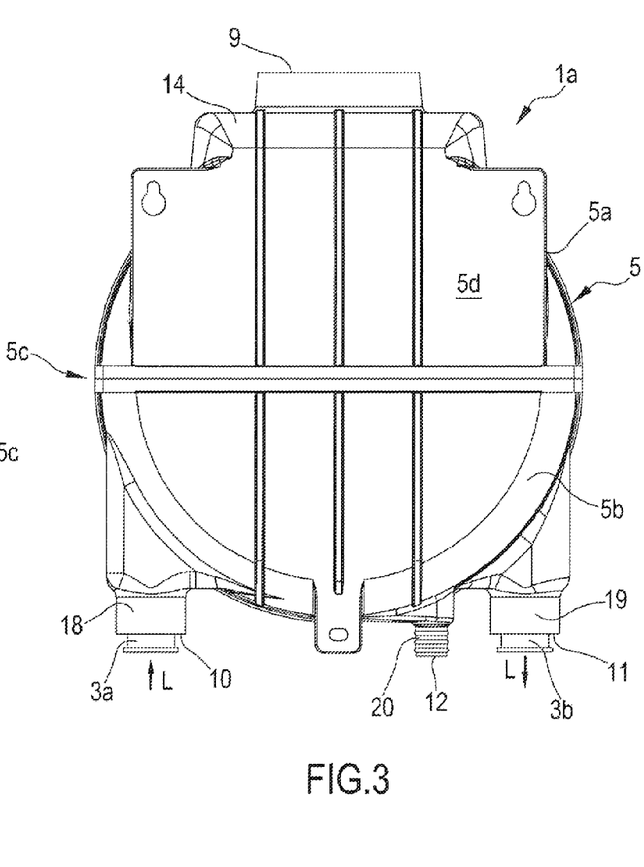

In FIGS. 1-3, a heat exchange cell belonging to a preferred embodiment of the set according to the invention is generally indicated at 1a.

The cell 1a belongs to a set of heat exchange cells 1a-1d having a thermal power falling within a predetermined range of minimum and maximum values, for example in one of the ranges described above. The above set of heat exchange cells 1a-1d is for example schematically shown in FIGS. 4a-4d which will be considered again hereinafter.

In the preferred embodiment shown, the heat exchange cells 1a-1d of the set are gas-liquid heat exchange cells of the condensation type in which a heat exchange is provided between a first heat transfer fluid constituted for example by water to be heated and a second heat transfer fluid constituted by hot combustion gases, the flow of which is schematically indicated with the letter G in the attached figures, coming from a burner schematised at 4 in the figures attached.

Each heat exchange cell 1a-1d of the set includes a helically shaped heat exchanger 2 having a thermal power falling within the above range of minimum and maximum values.

The heat exchanger 2 has a predetermined axial extension which is equal to the axial extension of the heat exchanger 2 having the minimum thermal power within the range of thermal power values of the set of heat exchange cells 1a-1d.

Preferably, the heat exchanger 2 comprises a single tubular duct 3 for the flow of the first heat transfer fluid coiled about a longitudinal axis X-X of the helix according to a plurality of coils beginning and ending respectively at an inlet connection 3a of the first heat transfer fluid and at an outlet connection 3b of such a fluid conventional per se.

Preferably, the winding pitch of the single coil formed by the tubular duct 3 is constant.

Preferably, the number of coils of the heat exchanger 2 is equal to the number of coils of the heat exchanger having the minimum thermal power within the range of thermal power values of the set.

In this way and as outlined above, it is advantageously possible to achieve the desired and constant axial extension of the heat exchangers 2 of the set while maintaining substantially unchanged, as the thermal power varies, the configuration of the elements of the cell 1*a*-1*d* that cooperate in abutment relationship and in a fluid-tight manner with the opposite axial ends of the heat exchanger 2.

For example, such elements can be a front wall and a rear wall of the containment casing 5 of the cell 1*a*-1*d*, further discussed hereinafter, or other abutment elements (not illustrated) positioned inside the containment casing.

Preferably, the helically-shaped heat exchanger 2 has an internal diameter that is substantially constant and preferably equal to the internal diameter of the heat exchanger having the minimum thermal power within the range of thermal power values of the set.

With particular reference to the first preferred embodiment illustrated in FIGS. 1-5, the set of heat exchange cells 1*a*-1*d* comprises a single containment casing 5 for all of the heat exchangers of the set, in which the helically-shaped heat exchanger 2 having the preselected power is mounted.

The containment casing 5 has an axial extension that is constant as the thermal power of the cell 1*a* varies within the range of thermal power values and equal to the axial extension of the cell 1*a*-1*d* having the minimum thermal power within the aforementioned range of thermal power values.

The containment casing 5 of this preferred embodiment is sealingly closed at the front end by a support plate, not shown, of the burner 4.

In the preferred embodiment shown, the tubular duct 3 has a cross-section of a flat oval shape (shown in FIGS. 4*a*-4*d* and 5); in particular, the coils of said plurality of coils of the tubular duct 3 of the heat exchanger 2 have a flat cross-section the major axis of which is substantially perpendicular to the longitudinal axis X-X of the helix.

An interstice 6, preferably of substantially constant width, is located between the flat surfaces of two successive coils of the tubular duct 3.

To this end and as already mentioned above, each one of the cells 1*a*-1*d* is preferably provided with suitable spacer elements, not better shown in the figures, such as ribs extending from the flat faces of the tubular duct 3 or comb-shaped spacer elements interposed between said flat faces.

Preferably, the helically-shaped heat exchanger 2 is mounted within the single containment casing 5 of the set in such a way as to define in said casing a feeding zone 7 of the second heat transfer fluid, in this case constituted by the hot combustion gases generated by the burner 4.

Preferably, the feeding zone 7 of the second heat transfer fluid is in particular defined within the containment casing 5 coaxially and internally with respect to the heat exchanger 2.

In this way, it is advantageously possible to have such a configuration within each of the heat exchange cells 1*a*-1*d* of the set as to obtain a flow of the second heat transfer fluid that goes from the feeding zone 7 radially outwards through the interstices 6 defined between the coils of the helically-shaped heat exchanger 2.

Preferably, the feeding zone 7 of the second heat transfer fluid has, within the set of heat exchange cells 1*a*-1*d*, a substantially constant size and equal to the minimum possible size as the thermal power of the heat exchanger 2 varies.

This preferred configuration of the feeding zone 7 of the second heat transfer fluid derives from the preferred configuration of the heat exchanger 2 according to which the latter has an axial extension that is substantially constant and equal to the axial extension of the heat exchanger 2 having the minimum thermal power and an internal diameter that is substantially constant and equal to the internal diameter of the heat exchanger 2 having the minimum thermal power within the range of maximum and minimum thermal power values of the set.

Advantageously and as outlined above, this preferred configuration of the heat exchanger 2 and of the feeding zone 7 of the second heat transfer fluid allows to standardize the components of the plurality of cells 1*a*-1*d* of the set different from the heat exchanger 2 and to keep the transversal size of the containment casing 5 as low as possible as the thermal power varies within the range of thermal power values of the set of cells 1*a*-1*d*.

In the preferred embodiment illustrated, the containment casing 5 is substantially cup-shaped and comprises a peripheral side wall 5*c* and a rear wall 5*d*.

Preferably, the containment casing 5 is provided at the front with an annular element 8 fixed to the peripheral side wall 5*c* and belonging to a front wall of the cell, conventional per se and not better shown in greater detail, and to which the support plate of the burner 4 is associated to close the casing 5 in a substantially sealing manner.

In the preferred embodiment shown, the containment casing 5 has in particular a substantially cylindrical shape and comprises two suitably shaped half-shells 5*a*, 5*b*.

In the operating configuration, the containment casing 5 of the heat exchange cells 1*a*-1*d* of the set is in fluid communication with external components (not shown), forming part of the apparatus or system in which the cells are mounted, by means of a plurality of openings 9-12 preferably formed on the side wall 5*c* of the casing 5 itself.

A first opening 9 is configured for the outlet of the second heat transfer fluid from the casing 5 and is preferably formed in a discharge cap 14 of such a fluid.

In the operating configuration of the heat exchange cells 1*a*-1*d* according to the preferred embodiment illustrated of the set, the outlet opening 9 is preferably positioned in such a way as to have a vertical axis and to be facing upwards.

Second and third openings 10, 11 are preferably formed at a free end of respective sleeves 18, 19 extending from the peripheral side wall 5*c* of the containment casing 5 and preferably integrally formed with the lower half-shell 5*b* of the casing 5.

Preferably, the sleeves 18, 19 have a constant interaxial distance as the thermal power of the cells 1*a*-1*d* varies within the range of maximum and minimum thermal power values of the set of cells 1*a*-1*d*.

Preferably, the opposite ends of the tubular duct 3 of the heat exchanger 2 are positioned in a respective sleeve 18, 19 of said pair of sleeves.

Preferably, the inlet and outlet connections 3*a*, 3*b* of the first heat transfer fluid to and from the tubular duct 3 of the heat exchanger 2 are mounted in abutment relationship in the sleeves 18, 19 so as to slightly protrude from the openings 10 and 11, as better shown in FIGS. 1-3, for the connection with external components of an apparatus or system—not shown—in which the specific heat exchange cell 1*a*-1*d* of the set is installed.

The openings 10 and 11 are therefore preferably configured in such a way as to accommodate the inlet and outlet connections 3*a*, 3*b* of the first heat transfer fluid (water to be heated) to and from the tubular duct 3 of the heat exchanger 2.

In the operating configuration of the heat exchange cells 1*a*-1*d* of the set, the openings 10, 11 of the containment casing 5 are respectively located at the rear and at the front relative to one another, with respect to the axial development of the heat exchange cells 1*a*-1*d* along the longitudinal axis X-X of the helically-shaped heat exchanger 2, and are facing downwards so as to facilitate the connection with the external components (not shown) of the apparatus or system in which the specific heat exchange cell 1a-1d of the set is installed.

In the preferred embodiment shown of the set of heat exchange cells 1a-1d and since such cells are of the condensation type, the containment casing 5 is further preferably provided with a fourth opening 12 formed at a free end with a respective sleeve 20 extending from the peripheral side wall 5c of the containment casing 5 and preferably integrally formed with the lower half-shell 5b of the casing 5.

The opening 12 is configured for discharging the condensate generated during the heat exchange process between the two heat transfer fluids and which is collected in the lower part of the containment casing 5.

As better shown in FIGS. 4a-4d, the heat exchange cells 1a-1d of the set of cells comprise a collection chamber 13 of the second heat transfer fluid externally defined with respect to the heat exchanger 2 between a radially outer wall 2a thereof and the side wall 5c of the containment casing 5.

For better clarity, a line tangent to the radially outer wall 2a of the heat exchanger 2 is shown with dotted lines in FIGS. 4a-4d. In this case, and since the heat exchanger 2 formed by the tubular duct 3 is helically shaped, the outer wall 2a is discontinuous, i.e. axially interrupted by the interstices defined between successive coils of the heat exchanger, and is formed by the radially outer face of the coils of the tubular duct 3.

As shown in FIGS. 4a-4d, the collection chamber 13 is frontally closed by the annular cover 8 forming part of the front wall of the cell and is closed at the back by the rear wall 5d of the containment casing 6 and is in fluid communication with the discharge cap 14 of the second heat transfer fluid (hot combustion gases).

Preferably and in order to limit undesired by-passes of the second heat transfer fluid from the collection chamber 13 directly to the discharge cap 14, the containment casing 5 is internally provided with a closing element 15, substantially plate-shaped, housed with shape coupling within an inner opening of the cap 14 at least partially formed in the thickness of the peripheral side wall 5c of the containment casing 5.

In a manner known per se and in order to limit the heat losses towards the outside environment and an excessive thermal stress of the rear wall 5d of the containment casing 5, the heat exchange cells 1a-1d of the set are preferably provided with a disc 16 made of a heat-insulating material and configured to close the feeding area 7 of the second heat transfer fluid.

Preferably, the heat exchange cells 1a-1d of the set are also provided with a substantially annular element made of a heat-insulating material, conventional per se and not shown, supported in a way known per se by the front wall of the cell.

Preferably, the disc 16 is centrally mounted on the rear wall 5d by means of fastening elements conventional per se, such as a screw 17.

According to the invention and as shown in FIGS. 4a-4d, the tubular duct 3 of the heat exchanger 2 of the heat exchange cells 1a-1d of the set has a radial extension of the coils proportional to the thermal power of the heat exchanger and such to maintain substantially constant the axial extension of the heat exchanger as its thermal power varies and equal to the axial extension of the heat exchanger 2 having the minimum thermal power within said range of thermal power values of the set.

Thanks to this latter feature and to the fact that the axial extension of the single containment casing 5 of the set of heat exchange cells 1a-1d is equally constant as the thermal power of the cell varies and equal to the axial extension of the cell having the minimum thermal power within the aforementioned range of thermal power values, it is advantageously possible to have a set of cells 1a-1d having the minimum possible dimensions and also having at the same time the possibility of achieving a high standardization of the external support elements of the single containment casing 5 of the heat exchange cells 1a-1d of the set belonging to the apparatus or system in which the single cell of the set is installed.

In particular and as outlined above, the interaxial distance between the sleeves 18, 19 is preferably unified and constant and the dimensions of the external support elements of the single containment casing 5 of the cells 1a-1d are unified and constant as the thermal power of the cells varies.

As outlined above and thanks to the fact that the heat exchanger 2 has a substantially constant internal diameter, it ensues that the feeding zone 7 of the second heat transfer fluid correspondingly has substantially constant dimensions as the thermal power varies within the range of maximum and minimum thermal power values of the set, a feature which advantageously allows to obtain a high standardization also of the components of the plurality of cells 1a-1d of the set different from the heat exchanger.

For example, it is advantageously possible to standardize:
- the dimensions of the disc 16 made of a heat-insulating material and of the substantially annular element made of a heat-insulating material supported by the front wall of the cells 1a-1d,
- the dimensions of the front closing wall of the single casing 5 of the set,
- the dimensions of the burner and of the corresponding accessories (when the cells 1a-1d of the set are heat exchange cells for water-heating apparatuses as in the preferred case illustrated in the attached figures) or the dimensions of the feeding duct of a hot fluid (when the cells 1a-1d of the set are heat recuperators).

In the preferred embodiment shown in the figures, the set of heat exchange cells 1a-1d comprises, by way of merely illustrative and non-limiting example, four heat exchange cells 1a-1d having an increasing thermal power within said predetermined range of minimum and maximum values, for example between 15 and 35 kW, in the case of so-called low power heat exchange cells.

Preferably and as shown in FIGS. 1-4, the single containment casing 5 of all the heat exchange cells 1a-1d of the set advantageously has a constant size as the thermal power of the cell varies within the above range of minimum and maximum values of thermal power and equal to the size of the containment casing 5 of the cell having the minimum thermal power within the range of thermal power values of the set.

The size of the containment casing 5 may be advantageously selected as a function of the thermal power of the cell within the preferred values indicated above.

Figure 4A:
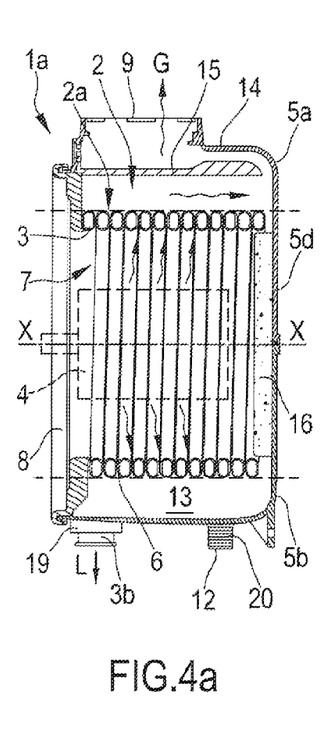
Figure 4B:
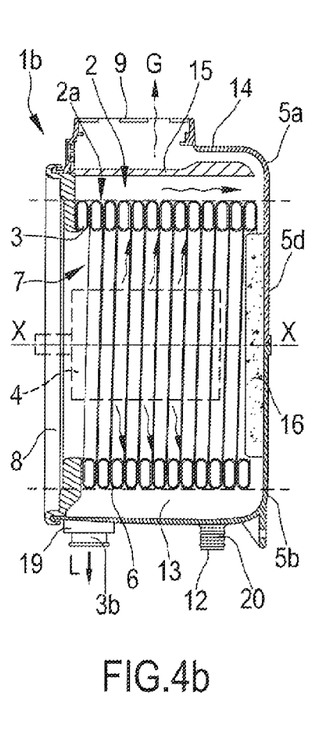
Figure 4C:
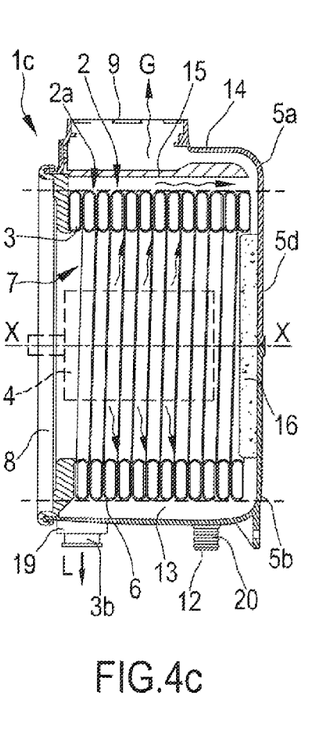
Figure 4D:
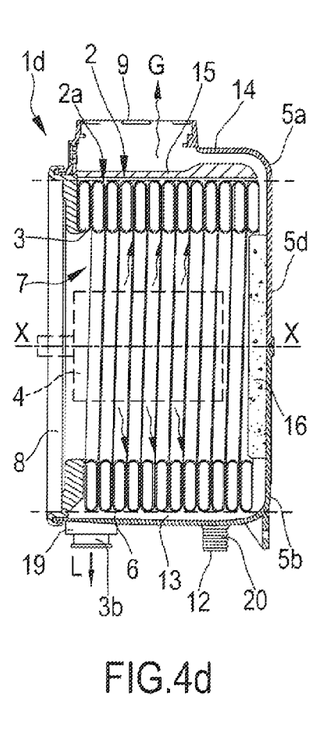

Preferably, moreover, the transversal extension of the single containment casing 5 of the set of heat exchange cells 1a-1d is such to define a housing seat in the casing 5 configured to contain the heat exchanger 2 of maximum radial size within the set of cells, as is better shown in FIG. 4d.

In the preferred embodiment shown, the tubular duct 3 of the heat exchanger 2 has a cross-section of the coils proportional to the thermal power of the heat exchanger 2.

Preferably, such a cross-section is obtained by providing a tubular duct of suitable cross-section as illustrated in the present description.

Within the framework of the set of heat exchange cells 1a-1d according to the invention, therefore, a preferred relationship of proportionality exists between the following entities:

i) the cross-section of the coils of the tubular duct 3 of the heat exchanger 2, the radial extension of the coils and the flow rate of the first heat transfer fluid flowing in said duct; and ii) the thermal power of the heat exchanger 2.

Advantageously, this preferred relationship of proportionality allows to maintain substantially constant the pressure drops of the first heat transfer fluid and the flowing speed thereof within the heat exchanger 2 as the thermal power varies, a technical effect particularly appreciated by the manufacturers of heating and air-conditioning apparatuses and systems.

Figure 5:
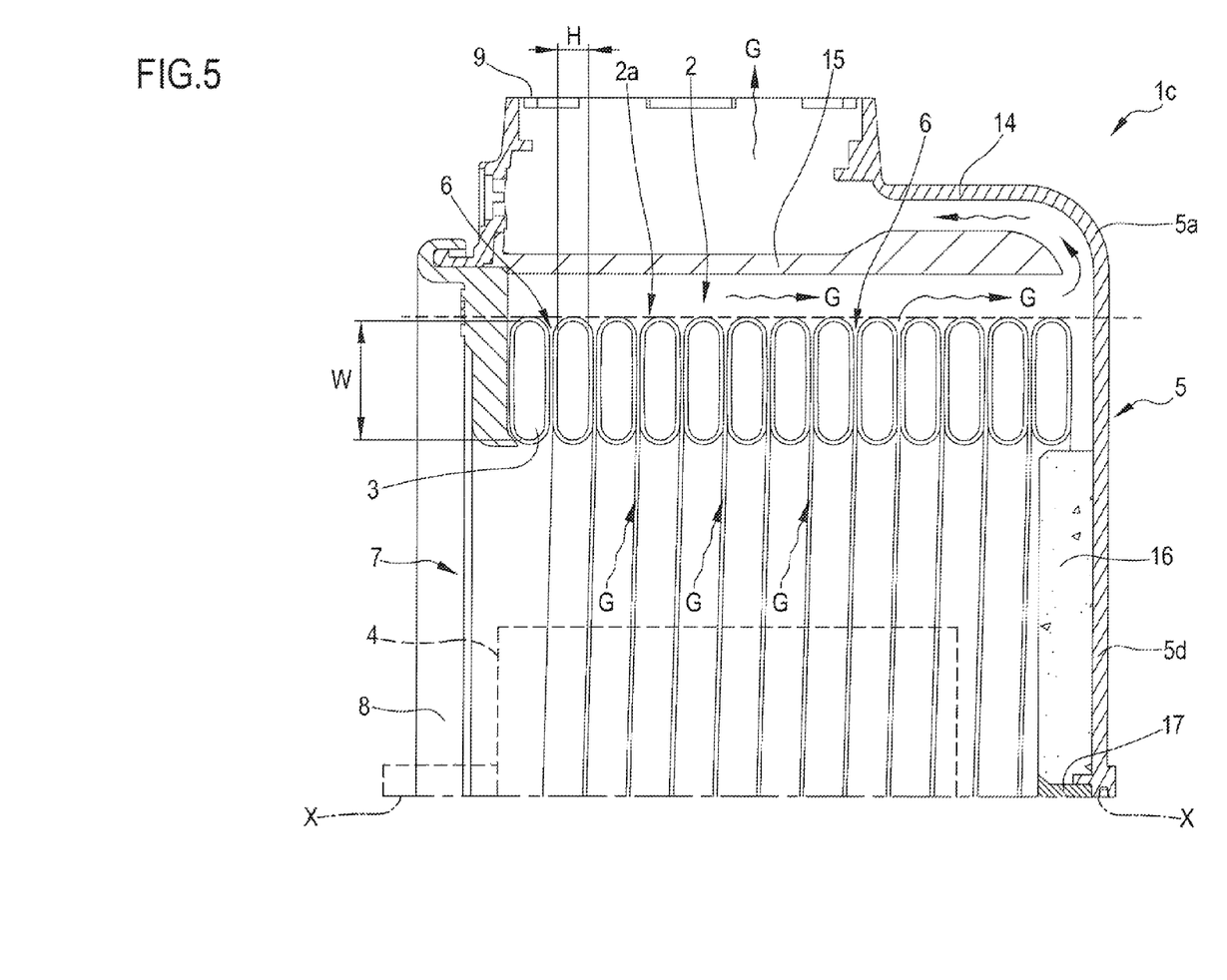
FIG. 5 is an enlarged scale view of the top part of FIG. 4c.
Figure 6A:
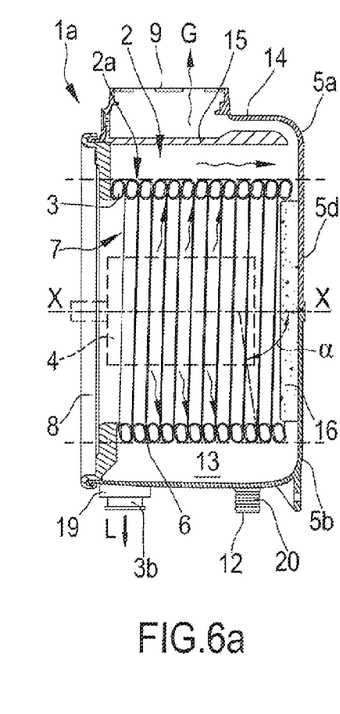
FIGS. 6a-6d are schematic cross-section views, similar to FIGS. 4a-4d, of respective heat exchange cells of the set equipped with an alternative embodiment of the heat exchanger.
Figure 6B:
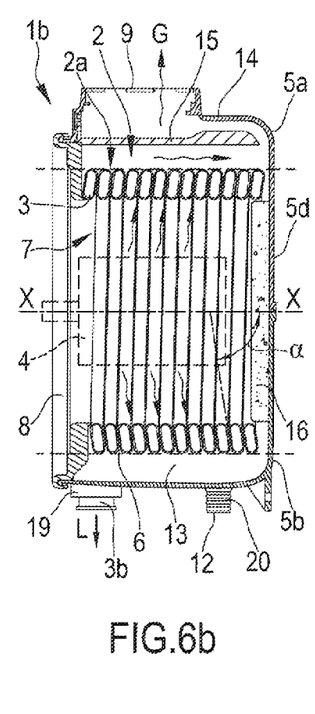
Figure 6C:
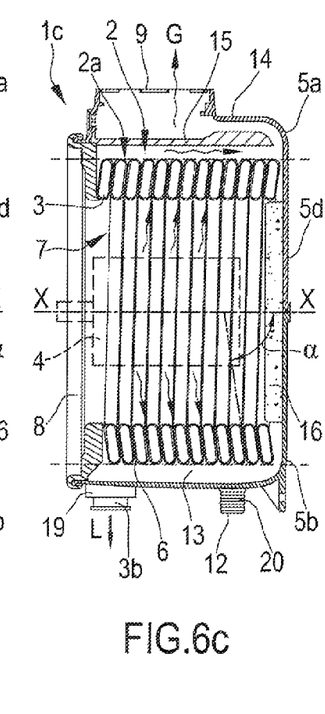
Figure 6D:
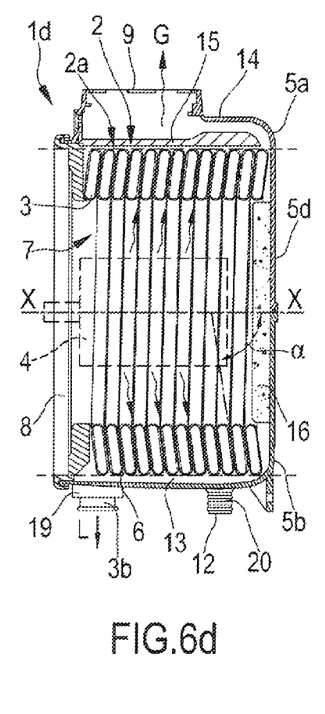

Preferably, and as is better shown in FIG. 5, the ratio between the inner width W and the inner height H of each coil of the heat exchanger 2, respectively measured in parallel to a major axis and to a minor axis of the cross-section of the tubular duct 3, is also proportional to the thermal power of the heat exchanger 2.

As already mentioned above, such a ratio W/H is preferably greater than 2.5 and more preferably is comprised between 2.5 and 5 as a function of the thermal power of the heat exchanger 2.

The Applicant has in particular experimentally observed that when the ratio W/H between the inner width and the inner height of each coil of the tubular duct 3 of the heat exchanger 2 is greater than 2.5, it is advantageously possible to reduce the temperature of the combustion gases generated by the burner 4 and radially leaving from the heat exchanger 2 down to values lower than those of the water to be heated (generally between 40° and 80° C.) leaving the cell 1a-1d of the set.

Advantageously, these temperature values of the combustion gases can reduce the thermal stress on the material of the containment casing 5 that can be made, if desired, of a plastic material and, this, without having metal protection ferrules.

A preferred embodiment of a method of manufacturing a set of heat exchange cells according to the invention, in particular of manufacturing the cells 1a-1d described above, will now be described hereinafter with particular reference to FIGS. 1-5.

In an initial step of the method, a single containment casing 5 of the plurality of thermal exchange cells 1a-1d of the set is provided, which casing 5 has an axial extension which is constant as the thermal power of the cell varies within a predetermined range of values of thermal power, for example between 1 and 35 kW (low power), and equal to the axial extension of the cell having the minimum thermal power within said range of thermal power values.

In a preferred embodiment, the step of providing the single containment casing 5 comprises providing the sleeves 18, 19 extending from the peripheral side wall 5c so that the sleeves have a constant interaxial distance as the thermal power of the cells 1a-1d of the set varies within the aforementioned range of thermal power values.

In a subsequent step, a plurality of helically-shaped heat exchangers 2, each having a thermal power falling within said range of minimum and maximum values and each comprising the tubular duct 3 for the flow of the first heat transfer fluid coiled about the longitudinal axis X-X of the helix according to a plurality of coils, is provided.

In a preferred embodiment and as discussed above, the number of coils of the tubular duct 3 is equal to the number of coils of the heat exchanger 2 having the minimum thermal power within the aforementioned range of thermal power values of the set.

In a preferred embodiment, the step of providing the aforementioned plurality of heat exchangers 2 comprises the steps of:

i) providing a tubular duct 3 having a cross-section of fluid flow of a predetermined value and proportional to the thermal power to be delivered; and ii) helically shaping said duct 3 so as to obtain a plurality of coils.

Preferably, the tubular duct 3 is essentially cylindrical in shape and is provided in step i) by means of conventional extrusion operations so as to obtain a predetermined length equal to the final length to be imparted to the heat exchanger 2 once it has been helically shaped.

In the method of manufacture of the preferred embodiment of the set of heat exchange cells 1a-1d shown in FIGS. 1-5, the step of providing the aforementioned plurality of helically-shaped heat exchangers 2 preferably comprises the step of plastically deforming along the radial direction the coils of the tubular duct 3 of the heat exchangers 2 in such a way as to obtain coils having a flat cross-section a major axis of which is substantially perpendicular to the longitudinal axis X-X of the helix.

Such a plastic deformation step can for example be carried out by means of the techniques and the apparatus described in the aforementioned International patent application WO 94/16272 in the name of Le Mer.

According to the invention, said plastic deformation step is carried out in such a way as to maintain substantially constant:

the cross-section of fluid flow of the tubular duct 3, the axial extension of the heat exchangers 2 equal to the axial extension of the heat exchanger 2 having the minimum thermal power within the aforementioned range of thermal power values of the set, and the internal diameter of the heat exchanger 2.

In a preferred alternative embodiment and as described above, the step of providing the aforementioned plurality of heat exchangers 2 comprises the steps of:

iii) providing a tubular duct 3 having a flat cross-section of fluid flow of a predetermined value and proportional to the thermal power;

iv) helically shaping the tubular duct 3 so as to obtain a plurality of coils having a flat cross-section a major axis of which is substantially perpendicular to the longitudinal axis X-X-of the helix.

The step of helically shaping the tubular duct 3 may be carried out by techniques and apparatuses known per se.

Also in this case, the aforementioned step of helically shaping the tubular duct 3 is carried out in such a way as to maintain substantially constant both the cross-section of fluid flow of the tubular duct 3, and the axial extension of the heat exchangers 2 of the aforementioned plurality.

In a further step of the method, it is envisaged to mount within the single containment casing 5 a heat exchanger 2 having the desired thermal power and selected within the aforementioned plurality of heat exchangers, so as to define within the containment casing 5 and coaxially and internally with respect to the heat exchanger 2 the feeding zone 7 of the combustion gases generated by the burner 4.

Since the aforementioned plurality of heat exchangers 2 has a substantially constant internal diameter as the thermal power varies, the feeding zone 7 also has substantially constant radial dimensions as the thermal power of the specific heat exchanger 2 that is mounted within the single containment casing 5 varies, which radial dimensions are preferably equal to the minimum possible ones.

According to the method of manufacturing the set of cells 1a-1d, the tubular duct 3 of the heat exchanger 2 is arranged so as to have a radial extension of the coils which is proportional to the thermal power of the heat exchanger 2 and such as to maintain substantially constant the axial extension of the heat exchanger 2 as its thermal power varies and equal to the axial extension of the heat exchanger 2 having the minimum thermal power within said range of thermal power values of the set.

The feeding zone 7, therefore, also has a substantially constant axial extension as the thermal power of the specific heat exchanger 2 that is mounted within the single containment casing 5 varies, which axial extension is preferably equal to the minimum possible one.

In a preferred embodiment, the step of mounting the helically-shaped heat exchanger 2 within the single containment casing 5 comprises positioning the opposite ends of the tubular duct 3 in the respective sleeves 18, 19 extending from the peripheral side wall 5c of the single containment casing 5.

By means of these preferred embodiments, it is advantageously possible to obtain a set of heat exchange cells 1a-1d having a different thermal power but a single containment casing 5 having a constant axial extension and equal to the minimum possible one and with a high standardization of components, as is shown in FIGS. 4a-4d.

The operation of the heat exchange cells 1a-1d of the set according to the invention does not differ from that of the heat exchange cells of known type and is essentially the following.

In practice, a heat exchange is carried out between the second heat transfer fluid and the first heat transfer fluid by feeding the second heat transfer fluid in the feeding zone 7, in this exemplary and non-limiting case by generating combustion gases G by means of the burner 4 coaxially and internally mounted with respect to the heat exchanger 2.

The second heat transfer fluid (combustion gases G) radially flows through the heat exchanger 2 passing in the interstices 6 formed between two successive coils of the tubular duct 3, transferring heat to the first heat transfer fluid (water to be heated) flowing inside the tubular duct 3 substantially in countercurrent to the flow of the second heat transfer fluid.

After having radially crossed the heat exchanger 2, the second heat transfer fluid (combustion gases G) is collected in the collection chamber 13 externally defined with respect to the heat exchanger 2 and thereafter flows into the discharge cap 14 and then leaves the heat exchange cell 1a-1d through the opening 9.

Advantageously, the flow of the second heat transfer fluid is guided towards the discharge cap 14 by means of the closing element 15 in such a way as to limit direct by-passes as is schematically shown in FIGS. 4a-4d.

With reference to FIGS. 6a-6d, a further preferred embodiment of the set of heat exchange cells 1a-1d according to the invention will now be described.

In the following description and in such figures, the elements of the cells which are structurally or functionally equivalent to those illustrated above with reference to FIGS. 1-5 will be indicated with the same reference numerals and will not be further described.

In the preferred embodiment shown in FIGS. 6a-6d, the heat exchanger 2 differs in that the tubular duct 3 has a flat cross-section a major axis of which forms an acute angle $\alpha$ with respect to the longitudinal axis X-X of the helix.

Preferably, the angle $\alpha$ has a value comprised between 60° and 87°.

This inclined configuration of the coils of the tubular duct 3 can be obtained by the method described above by providing a plastic deformation of the duct along a direction forming said acute angle $\alpha$ with respect to the longitudinal axis X-X of the helix.

Such a plastic deformation can for example be carried out by means of the techniques and the apparatus described in the aforementioned International patent application WO 94/16272 in the name of Le Mer.

Advantageously, the inclined configuration of the coils of the tubular duct 3 of this preferred embodiment allows to increase the surface of the tubular duct 3 exposed to the burner, with an increase of the radiant energy transmitted to the heat exchanger 2 and, therefore, to the first heat transfer fluid, and to effectively convey the second heat transfer fluid towards the rear part 5d of the casing 5 and, thus, towards the discharge cap 14.

Clearly, a man skilled in the art may introduce modifications and variants to the invention described hereinbefore in order to meet specific and contingent application requirements, variants and modifications which anyway fall within the scope of protection as defined in the attached claims.

The invention claimed is:

1. A method of manufacturing a set of heat exchange cells having a thermal power falling within a predetermined range of minimum and maximum values, each heat exchange cell comprising at least one heat exchanger mounted in a respective containment casing, wherein the method comprises the steps of:
   a) providing a single containment casing of a plurality of heat exchange cells of the set, said casing having a constant axial extension as the thermal power of the cell varies within said range of thermal power values, the axial extension being equal to the axial extension of the cell having the minimum thermal power within said range of thermal power values;
   b) providing a plurality of helically shaped heat exchangers, each having a thermal power falling within said range of minimum and maximum values and each comprising at least one tubular duct for the flow of a first heat transfer fluid coiled about a longitudinal axis of the helix and having a plurality of coils; and
   c) mounting within said single containment casing at least one helically shaped heat exchanger of said plurality of heat exchangers of the set,
   wherein said plurality of heat exchangers of the set has an internal diameter that is substantially constant as the thermal power of the heat exchanger varies within said range of thermal power values, and
   wherein said at least one tubular duct of each heat exchanger of the set has a radial extension of the plurality of coils proportional to the thermal power of the heat exchanger so as to maintain substantially constant the axial extension of the heat exchanger as its thermal power varies, the axial extension being equal to the axial extension of the heat exchanger having the minimum thermal power within said range of thermal power values of the set.

2. The method according to claim 1, wherein said set of heat exchange cells comprises from two to eight heat exchange cells having an increasing thermal power within said predetermined range of minimum and maximum values.

3. The method according to claim 1, wherein step a) of providing the single containment casing of said plurality of heat exchange cells of the set is carried out by providing a containment casing having a predetermined and constant size as the thermal power of the cell varies within said range of minimum and maximum values of thermal power.

4. The method according to claim 3, wherein a transversal extension of said single containment casing of the plurality of heat exchange cells of the set defines within the casing a housing seat configured to contain the heat exchanger of a maximum radial size within the set of cells.

5. The method according to claim 1, wherein said at least one tubular duct of the at least one heat exchanger has a cross-section of the coils proportional to the thermal power of the heat exchanger.

6. The method according to claim 1, wherein step b) of providing said plurality of helically shaped heat exchangers comprises the steps of:
   i) providing a tubular duct having a cross-section of fluid flow of a predetermined value and proportional to the thermal power to be delivered; and
   ii) shaping said tubular duct to a helical shape so as to obtain a plurality of coils.

7. The method according to claim 1, wherein the plurality of coils of said at least one tubular duct of the heat exchanger of said plurality of heat exchangers have a flat cross-section, a major axis of which is substantially perpendicular to said longitudinal axis of the helix.

8. The method according to claim 1, wherein the plurality of coils of said at least one tubular duct of the heat exchanger of said plurality of heat exchangers have a flat cross-section, a major axis of which forms an acute angle with respect to said axis.

9. The method according to claim 7, wherein step b) of providing said plurality of helically shaped heat exchangers further comprises the step of plastically deforming the coils along a substantially radial direction so as to obtain a plurality of coils having a flat cross-section, the major axis of which is substantially perpendicular to the longitudinal axis of the helix,
   wherein said plastic deformation step is carried out in such a way as to maintain substantially constant both the cross-section of fluid flow of the tubular duct and the axial extension of the heat exchanger of said plurality of heat exchangers.

10. The method according to claim 8, wherein step b) of providing said plurality of helically shaped heat exchangers further comprises the step of plastically deforming the coils along an axial/radial direction so as to obtain said plurality of coils having a flat cross-section, the major axis of which forms an acute angle with respect to said longitudinal axis of the helix,
    wherein said plastic deformation step is carried out in such a way as to maintain substantially constant both the cross-section of fluid flow of the tubular duct and the axial extension of the heat exchanger of said plurality of heat exchangers.

11. The method according to claim 7, wherein step b) of providing said plurality of helically shaped heat exchangers comprises the steps of:
    iii) providing a tubular duct having a flat cross-section of fluid flow of a predetermined value and proportional to the thermal power; and
    iv) shaping said tubular duct to a helical shape so as to obtain a plurality of coils having a flat cross-section, the major axis of which is substantially perpendicular to the longitudinal axis of the helix,
    wherein said helically shaping step is carried out so as to maintain substantially constant the axial extension of the heat exchanger of said plurality of heat exchangers as the thermal power varies.

12. The method according to claim 8, wherein step b) of providing said plurality of helically shaped heat exchangers comprises the steps of:
    iii) providing a tubular duct having a flat cross-section of fluid flow of a predetermined value and proportional to the thermal power; and
    iv) shaping said tubular duct to a helical shape so as to obtain a plurality of coils having a flat cross-section, the major axis of which forms an acute angle with respect to said longitudinal axis of the helix,
    wherein said helically shaping step is carried out so as to maintain substantially constant the axial extension of the heat exchanger of said plurality of heat exchangers as the thermal power varies.

13. The method according to claim 7, wherein a ratio between an inner width and an inner height of each coil of the helically shaped heat exchangers of said plurality of heat exchangers, respectively measured in parallel to a major axis and to a minor axis of the cross-section of said tubular duct, has a value proportional to the thermal power of the heat exchanger.

14. The method according to claim 8, wherein a ratio between an inner width and an inner height of each coil of the helically shaped heat exchangers of said plurality of heat exchangers, respectively measured in parallel to a major axis and to a minor axis of the cross-section of said tubular duct, has a value proportional to the thermal power of the heat exchanger.

15. The method according to claim 1, wherein step a) of providing the single containment casing of said plurality of heat exchange cells of the set comprises providing at least one pair of sleeves extending from a peripheral side wall of the single containment casing and having a constant inter-axial distance as the thermal power of the cell varies within said range of thermal power values; and wherein step c) of mounting within said single containment casing said at least one helically shaped heat exchanger of said plurality of heat exchangers of the set comprises positioning opposite ends of said at least one tubular duct in a respective sleeve of said pair of sleeves.

16. A set of heat exchange cells having a thermal power falling within a predetermined range of minimum and maximum values, each heat exchange cell comprising at least one helically shaped heat exchanger of a plurality of heat exchangers of the set and having a thermal power falling within said range of minimum and maximum values;
    wherein the set comprises a single containment casing of a plurality of heat exchange cells of the set in which said at least one helically shaped heat exchanger of said plurality of heat exchangers of the set is mounted;
    wherein each helically shaped heat exchanger of said plurality of heat exchangers of the set comprises at least one tubular duct for the flow of a first heat transfer fluid coiled about a longitudinal axis of the helix and having a plurality of coils;

wherein said plurality of heat exchangers of the set has an internal diameter that is substantially constant as the thermal power of the heat exchanger varies within said range of thermal power values;

wherein said at least one tubular duct of each heat exchanger of said plurality of heat exchangers of the set has a radial extension of the plurality of coils proportional to the thermal power of the heat exchanger so as to maintain substantially constant the axial extension of the heat exchanger as its thermal power varies, the axial extension being equal to the axial extension of the heat exchanger having the minimum thermal power within said range of thermal power values of the set; and wherein said single containment casing of the set has an axial extension which is constant as the thermal power of the cell varies, the axial extension being equal to the axial extension of the cell having the minimum thermal power within said range of thermal power values.

17. The set of heat exchange cells according to claim 16, comprising from two to eight heat exchange cells having an increasing thermal power within said predetermined range of minimum and maximum values.

18. The set of heat exchange cells according to claim 16, wherein said single containment casing of said plurality of heat exchange cells of the set has a predetermined and constant size as the thermal power of the cell varies within said range of minimum and maximum values of thermal power.

19. The set of heat exchange cells according to claim 18, wherein a transversal extension of said single containment casing of the set defines within the casing a housing seat configured to contain the heat exchanger of a maximum radial size within the set of cells.

20. The set of heat exchange cells according to claim 16, wherein said at least one tubular duct of the at least one heat exchanger of said plurality of heat exchangers has a cross-section of the coils proportional to the thermal power of the heat exchanger.

21. The set of heat exchange cells according to claim 16, wherein the plurality of coils of said at least one tubular duct of the heat exchanger of said plurality of heat exchangers have a flat cross-section, a major axis of which is substantially perpendicular to said longitudinal axis of the helix.

22. The set of heat exchange cells according to claim 16, wherein the plurality of coils of said at least one tubular duct of the heat exchanger of said plurality of heat exchangers have a flat cross-section, a major axis of which forms an acute angle with respect to said longitudinal axis of the helix.

23. The set of heat exchange cells according to claim 21, wherein a ratio between an inner width and an inner height of each coil of the helically shaped heat exchangers of said plurality of heat exchangers, respectively measured in parallel to a major axis and to a minor axis of the cross-section of said tubular duct, has a value proportional to the thermal power of the heat exchanger.

24. The set of heat exchange cells according to claim 22, wherein a ratio between an inner width and an inner height of each coil of the helically shaped heat exchangers of said plurality of heat exchangers, respectively measured in parallel to a major axis and to a minor axis of the cross-section of said tubular duct, has a value proportional to the thermal power of the heat exchanger.

25. The set of heat exchange cells according to claim 23, wherein the ratio between the inner width and the inner height of each coil of the heat exchangers of said plurality of heat exchangers has a value greater than 2.5 as a function of the thermal power of the heat exchanger.

26. The set of heat exchange cells according to claim 24, wherein the ratio between the inner width and the inner height of each coil of the heat exchangers of said plurality of heat exchangers has a value greater than 2.5 as a function of the thermal power of the heat exchanger.

27. The set of heat exchange cells according to claim 16, wherein said single containment casing of the set comprises at least one pair of sleeves extending from a peripheral side wall of the single containment casing and having a constant inter-axial distance as the thermal power of the cell varies within said range of thermal power values; and wherein opposite ends of said at least one tubular duct of said at least one helically shaped heat exchanger of said plurality of heat exchangers are positioned in a respective sleeve of said pair of sleeves.

* * * * *